US011868358B1

(12) United States Patent
Betthauser et al.

(10) Patent No.: US 11,868,358 B1
(45) Date of Patent: Jan. 9, 2024

(54) CONTEXTUALIZED NOVELTY FOR PERSONALIZED DISCOVERY

(71) Applicant: Microsoft Technology Licensing, LLC, Redmond, WA (US)

(72) Inventors: Leo Moreno Betthauser, Kirkland, WA (US); Jing Tian, Redmond, WA (US); Yijian Xiang, Redmond, WA (US); Pramod Kumar Sharma, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/841,481

(22) Filed: Jun. 15, 2022

(51) Int. Cl.
*G06F 16/2457* (2019.01)
*G06N 3/08* (2023.01)

(52) U.S. Cl.
CPC ......... *G06F 16/24578* (2019.01); *G06N 3/08* (2013.01)

(58) Field of Classification Search
CPC .......................... G06F 16/24578; G06N 3/08
See application file for complete search history.

(56) References Cited

U.S. PATENT DOCUMENTS

| 8,285,728 | B1 | 10/2012 | Rubin | |
| 10,949,432 | B1* | 3/2021 | Grayson | G06F 16/9035 |
| 2015/0248480 | A1* | 9/2015 | Miller | G06Q 10/101 707/723 |
| 2016/0364481 | A1* | 12/2016 | Basilico | G06F 16/24578 |
| 2020/0005149 | A1 | 1/2020 | Ramanath et al. | |
| 2020/0159861 | A1* | 5/2020 | Baeck | H04L 63/0876 |
| 2020/0286013 | A1* | 9/2020 | McCord | G06Q 10/0633 |
| 2021/0042366 | A1* | 2/2021 | Hicklin | G06Q 10/10 |
| 2021/0286820 | A1* | 9/2021 | Umeda | G06F 16/93 |

FOREIGN PATENT DOCUMENTS

| WO | 2006102122 A2 | 9/2006 |
| WO | 2008083504 A1 | 7/2008 |
| WO | 2009065149 A2 | 5/2009 |
| WO | 2011097017 A1 | 8/2011 |

OTHER PUBLICATIONS

Hur, et al., "Development of Intelligent Information System for Digital Cultural Contents", in Journal of Mathematics vol. 9, Issue 3,, Jan. 26, 2021, pp. 1-15.
"International Search Report and Written Opinion Issued in PCT Application No. PCT/US23/022303", dated Aug. 4, 2023, 15 Pages.

* cited by examiner

*Primary Examiner* — Etienne P Leroux
(74) *Attorney, Agent, or Firm* — NovoTechIP International PLLC (57) ABSTRACT

A data processing system implements obtaining query parameters for a query for content items in a datastore, the query parameters including attributes of content items for which a search is to be conducted; obtaining a first set of content items from a content datastore based on the query parameters; analyzing the first set of content items using a first machine learning model trained to generate relevant content information that identifies a plurality of relevant content items included in the first set of content items; and analyzing the plurality of relevant content items using a second machine learning model configured to output novel content information, the novel content information including a plurality of content items predicted to be relevant and novel, the novel content information ranking the plurality of content items predicted to be relevant and novel based on a novelty score associated with each respective content item.

14 Claims, 7 Drawing Sheets

CONTEXTUALIZED NOVELTY FOR PERSONALIZED DISCOVERY

BACKGROUND

Numerous search services exist that enable users to input search parameters and to obtain search results relevant to the search parameters. These search services may be configured provide functionality for searching for relevant documents, images, audio, video, web-based content, and/or other types of content. Many such services have been implemented as standalone services for searching for content in public and/or private datastores. Other such services have also been integrated into various applications to enable users of these applications to search for and utilize content determined to be relevant to the search parameters provided by the users. However, relevance alone is often an insufficient metric for identifying content to present to a user. Often the user is searching for content that is not just relevant to their search parameters but is also novel content that the user has not already experienced. Hence, there is a need for improved systems and methods that provide a technical solution for identifying both relevant and novel content.

SUMMARY

An example data processing system according to the disclosure may include a processor and a machine-readable medium storing executable instructions. The instructions when executed cause the processor to perform operations including obtaining query parameters for a query for content items in a datastore, the query parameters including attributes of content items for which a search is to be conducted; obtaining a first set of content items from a content datastore based on the query parameters; analyzing the first set of content items using a first machine learning model trained to generate relevant content information that identifies a plurality of relevant content items included in the first set of content items; and analyzing the plurality of relevant content items using a second machine learning model configured to output novel content information, the novel content information including a plurality of content items predicted to be relevant and novel, the novel content information ranking the plurality of content items predicted to be relevant and novel based on a novelty score associated with each respective content item.

An example method implemented in a data processing system for conducting a contextualized search for relevant and novel content includes obtaining query parameters for a query for content items in a datastore, the query parameters including attributes of content items for which a search is to be conducted; obtaining a first set of content items from a content datastore based on the query parameters; analyzing the first set of content items using a first machine learning model trained to generate relevant content information that identifies a plurality of relevant content items included in the first set of content items; and analyzing the plurality of relevant content items using a second machine learning model configured to output novel content information, the novel content information including a plurality of content items predicted to be relevant and novel, the novel content information ranking the plurality of content items predicted to be relevant and novel based on a novelty score associated with each respective content item.

An example machine-readable medium on which are stored instructions according to the disclosure includes instructions, which when executed, cause a processor of a programmable device to perform operations of obtaining query parameters for a query for content items in a datastore, the query parameters including attributes of content items for which a search is to be conducted; obtaining a first set of content items from a content datastore based on the query parameters; analyzing the first set of content items using a first machine learning model trained to generate relevant content information that identifies a plurality of relevant content items included in the first set of content items; and analyzing the plurality of relevant content items using a second machine learning model configured to output novel content information, the novel content information including a plurality of content items predicted to be relevant and novel, the novel content information ranking the plurality of content items predicted to be relevant and novel based on a novelty score associated with each respective content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for conducting contextualized searches for relevant and novel content are provided. These techniques provide a solution to the technical problem of identifying content that is both relevant and novel in response to a search query. Relevant content is content that is connected to or related to the search query. Novel content is new content that is new or unfamiliar to the user. The techniques for conducting contextualized searches herein provide search results that are both relevant and novel. A technical benefit of this approach enables the user to discover content that is relevant to their search criteria while extending the user experience to include content that the user is predicted to not have encountered previously based on the parameters of the search query. Yet another benefit of this approach is that these techniques can reduce the computing and memory resources required to support the contextualized searches because users are less likely to repeatedly refine and resubmit a search query in an attempt to discover content that is both relevant and novel.

The contextual search techniques provide a search pipeline in which the relevance determination and novelty determinations are decoupled. The pipeline includes a relevance model configured to analyze the search query and to output a prediction that certain content items of a collection of content items are relevant to the search query. The pipeline also includes a novelty model that is configured to analyze the search query and the collection of content items determined to be relevant and to output a ranked set of content items that are determined to be novel. A technical benefit of this approach is that the models used to determine relevance and novelty can be optimized for the specific task of determining relevance or novelty respectively. Consequently, the complexity of the models are significantly reduced, thereby significantly decreasing the computing and memory resources required to train and execute the models. Furthermore, the pipeline configuration facilitates mixing and matching of relevance and novelty determining models. The relevance model and the novelty model can each be selected best suit the particular implementation of the pipeline. These and other technical benefits of the techniques disclosed herein will be evident from the discussion of the example implementations that follow.

Figure 1:
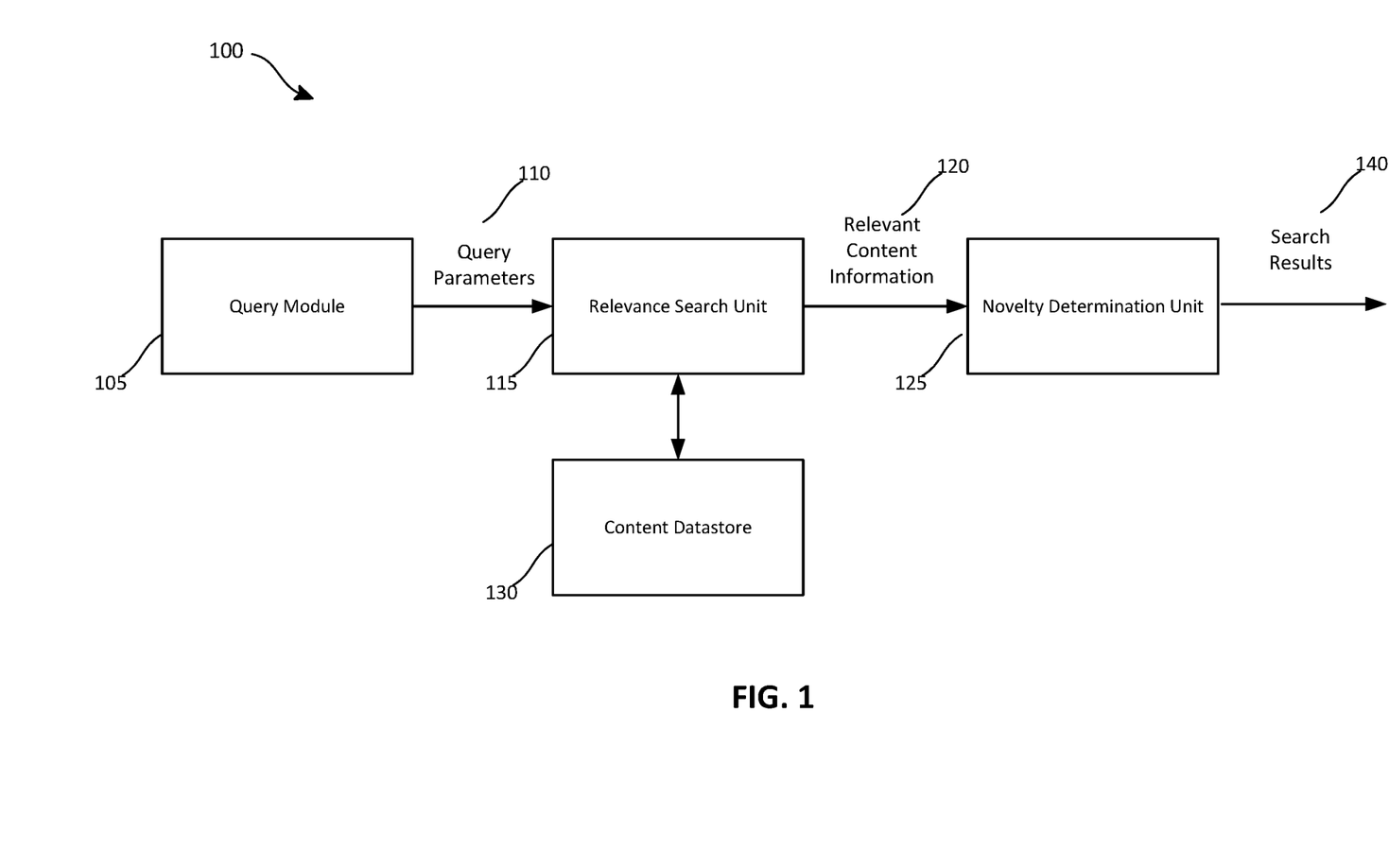
FIG. 1 is a diagram showing an example search pipeline in which the techniques disclosed herein may be implemented.

FIG. 1 is a diagram showing an example search pipeline 100 in which the techniques disclosed herein may be implemented. The search pipeline 100 includes a query module 105, a relevance search unit 115, a novelty determination unit 125, and a content datastore 130. In some implementations, the search pipeline 100 is implemented as a cloud-based service that enables a user to search for content in the content datastore 130. In some implementations, the search pipeline 100 is implemented as part of a cloud-based application, and the search pipeline 100 enables users of the application to search for content that can be viewed, modified, or otherwise consumed in the application. In other implementations, the search pipeline 100 may be implemented on a computing device, such as but not limited to a laptop or desktop computer system, a smartphone, or computing device having other form factor.

The query module 105 is configured to provide a user interface in which a user may define query parameters for conducting a search for relevant and novel content of the content stored in the content datastore 130. The query module 105 may be configured to accept various types of inputs from the user. In some implementations, the query module 105 is configured to accept structured and/or unstructured textual inputs. The unstructured textual inputs may include keywords or phrases for which the user is searching for content. The unstructured textual input may include multiple keywords or phrases. The structured textual inputs may be query strings that are formatted according to a query syntax. The particular query syntax may vary among different implementations of the query module 105.

In some implementations, the query module 105 is configured to accept content items, such as electronic documents, images, videos, audio files, and/or other types of electronic content as a query parameter. The user may provide content items that are relevant to the particular search and the query module 105 is configured to extract query parameter information from the content. In a non-limiting example, a user researching a particular topic provides one or more document as example of the types of documents that the user would find relevant. These documents may include one or journal documents, patent publications, and/or other electronic documents which provide context for determining relevancy of other content items.

The query module 105 may include one or more machine learning models that are trained to extract information from the electronic content and output textual query parameters based on the content of the electronic content. In some implementations, the query module 105 includes one or more natural language processing (NLP) models configured to analyze documents and extract relevant information from the electronic documents, such as but not limited author information, topic information, publication information, and/or other information associated with the electronic documents. In some implementations, the query module 105 include one or more image processing models configured analyze image files and output information about the images, such as but not limited to the subject matter of the image, textual content identified in the image, color information, and/or other information that may be determined by analyzing the image. In some implementations, the query module 105 may include audio and/or video processing transformer models that are configured to analyze audio and/or video content and to extract a transcript of spoken language included in the content, topic or subject matter information determined for the content, and/or other information that be extracted from the content items. Other types of models may also be provided in addition to or instead of one or more of the models described in the preceding examples. A technical benefit of this approach is that the user may provide content items that the user finds relevant to the query module 105 and the query module 105 automatically analyzes these content items to extract query parameter information. This approach can significantly improve the user experience by enabling the user to provide examples of content items that the user finds relevant rather than having to manually construct a complex query that may not accurately reflect what makes the example content relevant.

A technical benefit of the architecture of the search pipeline 100 is that the query module 105 provides a flexible tool for the user to define the query parameters. The query parameters define attributes of content items for which a search is being conducted. The query module 105 can be configured to accept one or more of the various types of inputs described above, in addition to other types of inputs, and output a set of combined set of query parameters as the query parameters 110.

The query parameters 110 output by the query module 105 are provided as input to the relevance search unit 115. The relevance search unit 115 is configured to analyze the query parameters 110 and to identify relevant content items in the content datastore 130. The content datastore 130 may include electronic documents, images, audio content, video content, and/or other types of electronic content that is searchable by the user via the search pipeline 100. The content datastore 130 may include metadata information associated with the content items. The metadata includes attributes of each of the content items to facilitate determining relevant and novel documents to present users in response to queries. The content datastore 130 may be a public datastore that is searchable by any users or may be a private datastore that is restricted to subscribers, members of an enterprise or other organization, or other authorized users.

The relevance search unit 115 implements one or more machine learning models to identify relevant content from the content datastore 130. The one or more machine learning models are configured to output the relevant content information 120. The relevant content information 120 is a subset of the content items included in the content datastore 130 that have been determined to be relevant based on the query parameters 110 and attributes of the content items. The relevant content information 120 include ranking information that indicates a predicted relevance of each of the content items. In some implementations, the metadata associated with the content included in the content datastore 130 and the query parameters 110 may be encoded by a relevance search unit 115 and the encoded query parameters 110 used to identify relevant content items based on the encoded metadata. In some implementations, the relevance search unit 115 may use a machine learning model trained to generate a weighted graph based on the encoded query parameters 110 and the metadata associated with the content items in the content datastore 130. The weights of the graph representing how relevant attributes of the content items of the content datastore 130 are to one or more query parameters 110. The examples which follow describe how such a graph may be generated and used to determine the relevance of content items in the content datastore 130. The relevant content information 120 output by the relevance search unit 115 may be a subset of the weighted graph. Additional details of how such a weighted graph may be generated are provided in the examples which follow.

The novelty determination unit 125 is configured to receive the relevant content information 120 output by the relevance search unit 115 and to output search results 140 that include novel content items included in the relevant content information 120. The novelty determination unit 125 may include one or more machine learning models that are configured to analyze the relevant content information 120 and to determine a novelty score for the content items identified in the relevant content information 120. The novelty determination unit 125 may rank the documents according to their novelty scores and provide the ranked documents in the search results 140. In some implementations, the novelty determination unit 125 includes a subset of the content items identified in the relevant content information 120 for which the novelty score for those content items exceeds a predetermined threshold.

Figure 2:
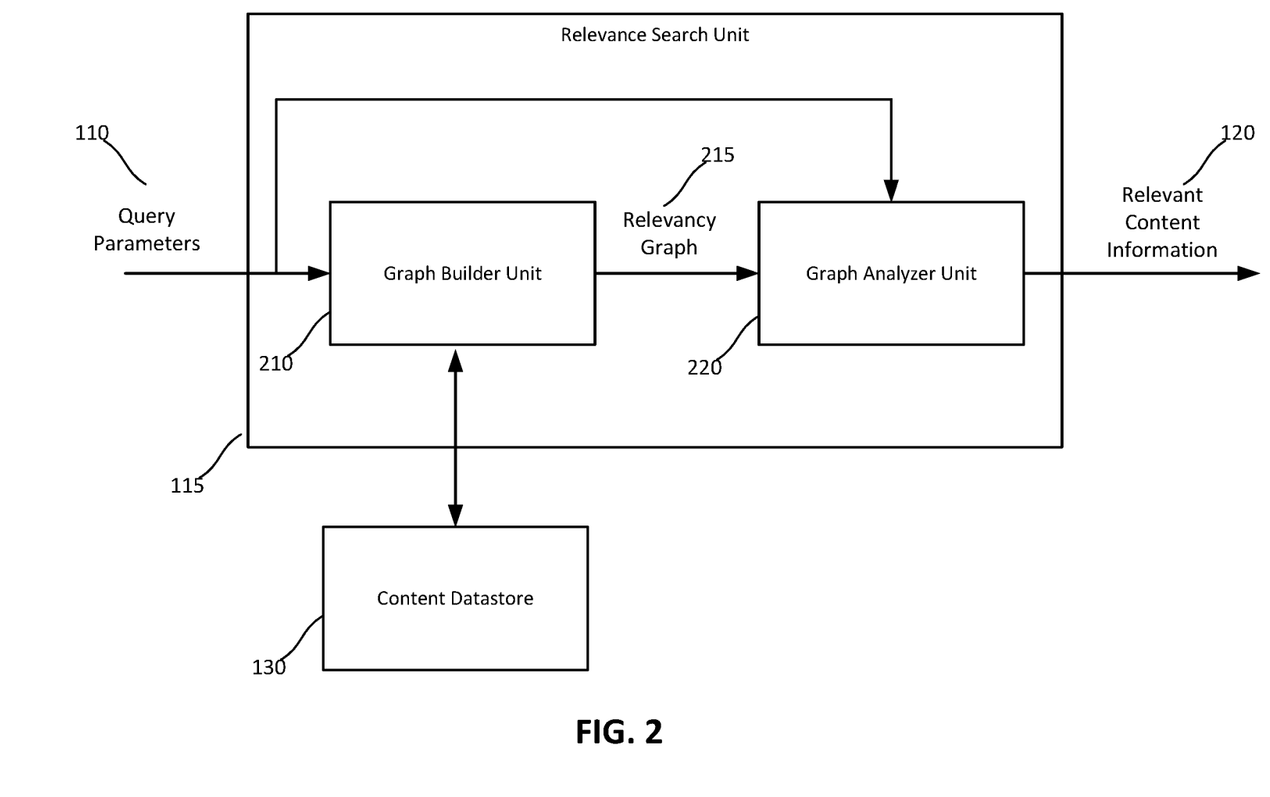
FIG. 2 shows an example implementation of the relevance search unit of the search pipeline shown in FIG. 1.

FIG. 2 shows an example implementation of the relevance search unit 115 of the search pipeline shown in FIG. 1. The example implementation of the relevance search unit 115 includes a graph builder unit 210 and a graph analyzer unit 220. The query parameters output by the query module 105 are provided as an input to both the graph builder unit 210 and the graph analyzer unit 220.

The graph builder unit 210 includes a deep learning relevancy model trained to generates a weighted relevancy graph 215 based on the query parameters 110. The graph builder unit 210 may select content items from the content datastore 130 based on the query parameters 110 received from the query module 105. The query parameters 110 may include keywords and/or phrases that that were entered as a query text and/or extracted from example content items provided as part of the search query.

In a non-limiting example, the user is a medical researcher is attempting to ascertain the current state of the art for therapies for treating a particular illness provides keywords associated with the disease, several medical journal articles associated with therapies for the disease, and several patent publications related to the disease and current therapies that have been published and/or patented for the treatment of the disease. The query module 105 extracts information from the journal articles, such as topic information, author information, and/or other information that may be useful for identifying relevant content items in the content datastore 130. The query module 105 extracts information from the patent publications, such as inventor information, invention subject matter, patent classification information, patent claim information, and/or other information that may be useful for identifying relevant content items in the content datastore 130. The graph builder unit 210 uses the query parameters provided by the user and extracted from the example content items provided with the query to identify content items in the content datastore 130 based on the metadata associated with the content items.

Figure 4:
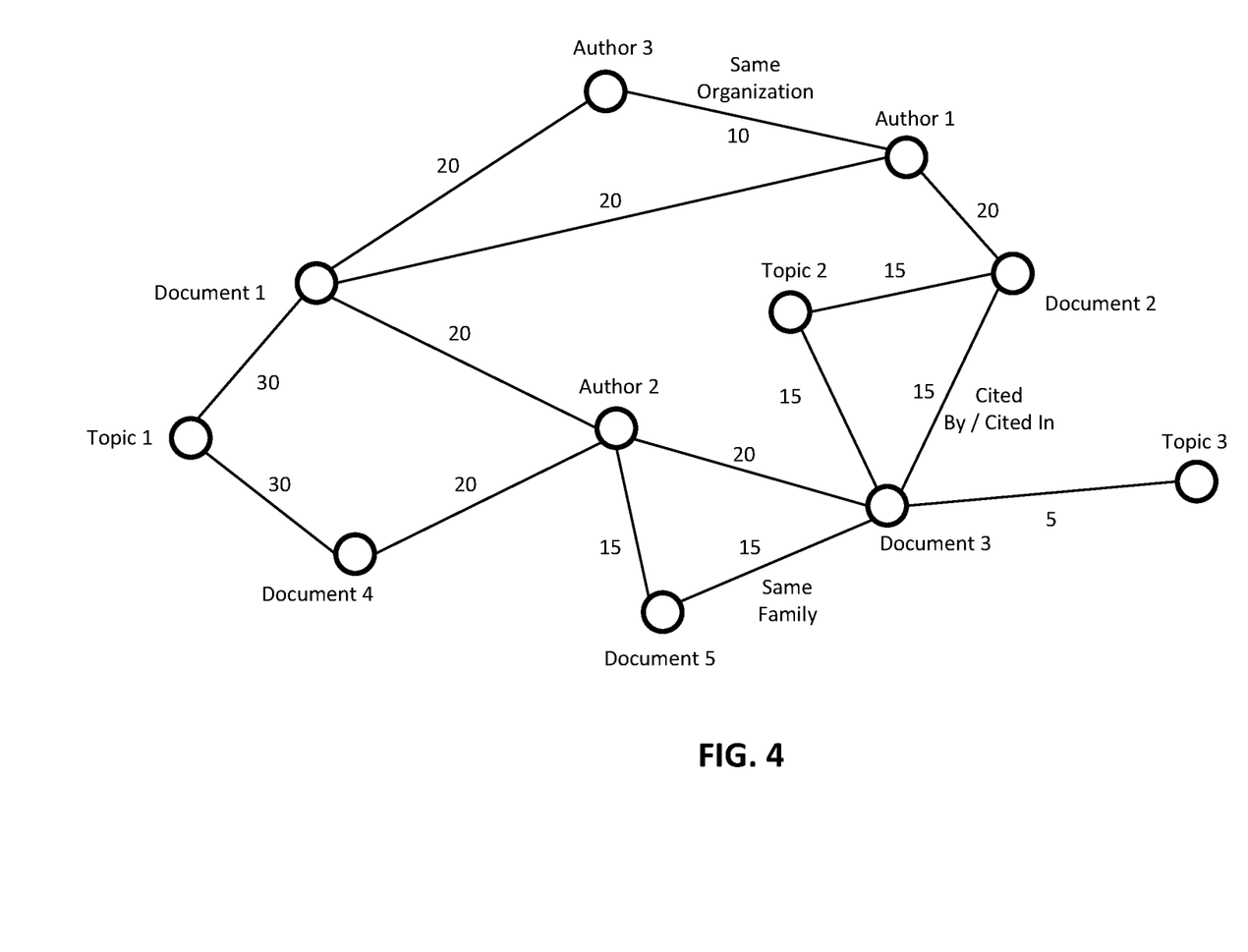
FIG. 4 is a diagram of an example graph generated by the search pipeline shown in FIG. 1.

The content items stored in the content datastore 130 are associated with metadata that describes the content items. The graph builder unit 210 may use the metadata associated with the content items to build a weighted graph based on the content items. An example of such a graph is shown in FIG. 4. The graph builder unit 210 may provide the metadata associated with the content items to a deep learning graph builder model that is configured to build a relevance graph in which the nodes represent the content items and various attributes of these content items that may be used to determine relevancy. The edges of the relevance graph representing relationships between the nodes.

Referring to the non-limiting example shown in FIG. 4, the user provided a set of journal articles and patent publications as part of the search query. The graph builder unit 210 selects content items from the content datastore 130 and analyzes the metadata of the content items using the graph builder model to generate the relevance graph shown in FIG. 4. The graph builder model is trained to create nodes for the relevant content items selected from the content datastore 130, which are shown as Documents 1, 2, 3, 4, and 5 in this example. The graph builder model also creates nodes for certain aspects of the documents, such as the author and topics included in the documents. The graph builder model creates edges between nodes that are predicted to be relevant to one another. The nodes for authors and the documents which they authored are linked by edges. The nodes for topics and the documents in which these topics are discussed are also linked by edges of the relevance graph. Other nodes may also be linked based on common attributes, such as the document nodes being linked where one of the documents cites and the other document or author nodes being linked due to the authors belonging to the same organization. Each of the edges have been assigned a weight. The graph builder model assigns the weights to the edges representing how relevant the two nodes connected by the edge are to one another. The example shown in FIG. 4 provides simple example of a relevance graph that to illustrate the techniques described herein. Other implementations may include nodes that represent other types of content items and attributes thereof and may be connected by edges that represent other types of relationships between these entities.

The relevancy graph 215 generated by the graph builder unit 210 is provided as an input to the graph analyzer unit 220. The graph analyzer unit 220 is configured to generate a subgraph by filtering the fully indexed relevancy graph 215 to reduce the size of the graph to include a subset of data from the relevancy graph 215 that is most relevant. The subgraph may be generated based on user preferences specified in the query parameters 110. The user preferences may indicate which types of nodes and/or edge information may be included in the subgraph. In a non-limiting example, the user is searching patent documents that are relevant and novel. The user may specify certain types of data be included in the subgraph, such as but not limited to the patent title, inventors, patent family information, and patent assignee. Other nodes and edges may be filtered out of the relevancy graph 215 to produce the subgraph.

One the subgraph has been created, the graph analyzer unit 220 analyzes the subgraph to identify relevant content items. In some implementations, the graph analyzer unit 220 is configured to traverse the subgraph using one or more graph traversal algorithms. The particular graph traversal algorithm or algorithms used may vary from implementation to implementation. The graph analyzer unit 220 traverses the graph to visit each node n of the nodes that make up the subgraph. The graph analyzer unit 220 determines a likelihood of observing a particular node n given a set of input nodes N. Once the likelihoods have been computed, the graph analyzer unit 220 ranks the likelihoods in decreasing order and outputs the top K results as the relevant content information 120. The relevant content information 120 is provided to the novelty determination unit 125 to be analyzed to identify novel content. In some implementations, the ranked results are a deep learning model of the novelty determination unit 125 to compute a one vs rest novelty score for each item corresponding to the top K nodes.

In some implementations, the likelihood of observing a particular node n may be determined using Personalized PageRank (PPR). PPR is an algorithm for measuring node proximity in graph analysis. The PPR value $\pi(s,t)$ represents the probability that a random walk from a source node s of the graph terminates at a target node t. The PPR value represents a probability that an a-discounted random walk from node s will terminate at node t. The a-discounted random walk represents a random traversal of the graph which may either terminate at each step at a current node a or moves to a random out-neighbor with a probability of 1-a. Consequently, the sum of the PPR values for each node t sum up to a value of 1. PPR is an example of one method that may be applied in some implementations. Other implementations may utilize other graph traversal methods and means for determining the likelihood of observing a particular node n given a set of input nodes N.

Figure 3:
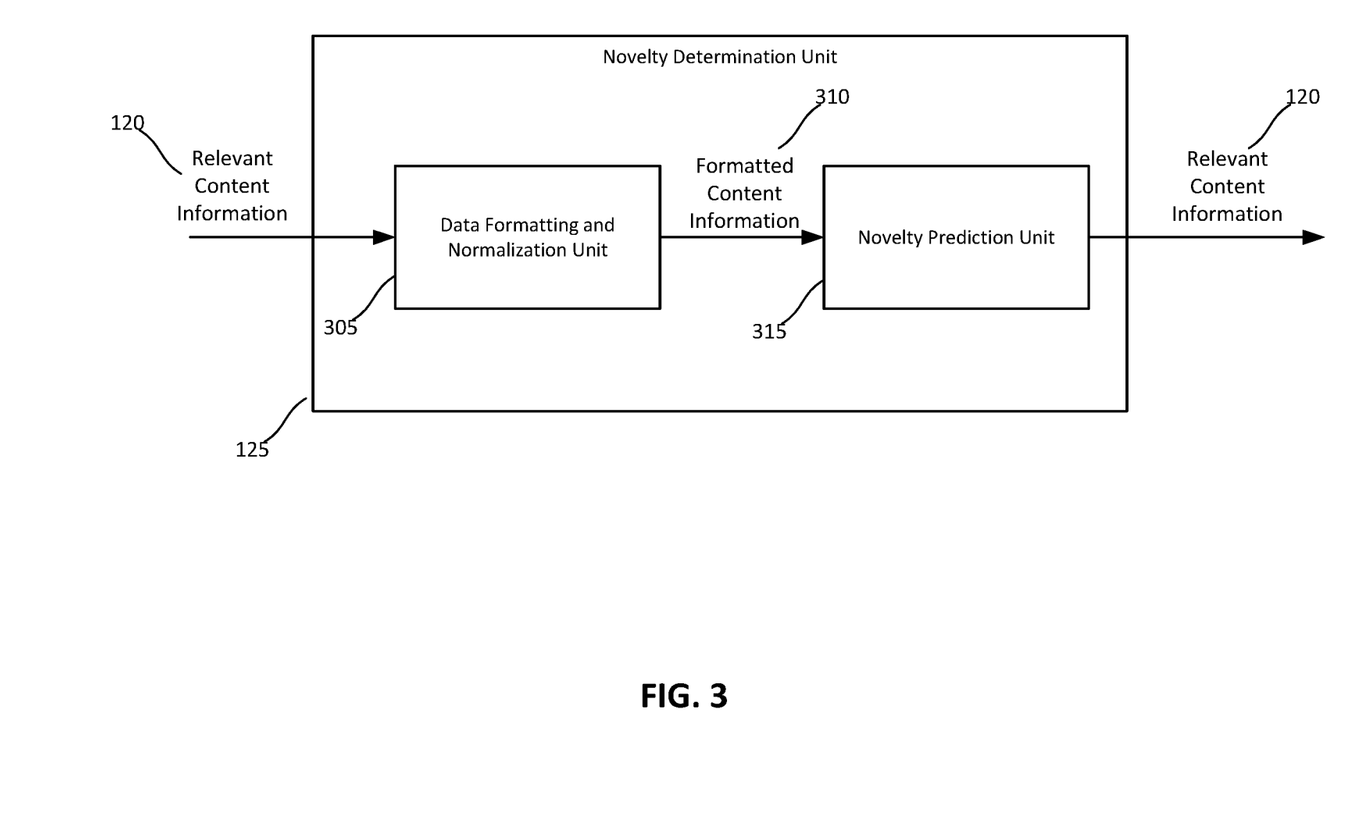
FIG. 3 shows an example implementation of the novelty determination unit of the search pipeline shown in FIG. 1.

FIG. 3 shows an example implementation of the novelty determination unit 125 of the search pipeline shown in FIG. 1. The example implementation of the novelty determination unit 125 includes a data formatting and normalization unit 305 and a novelty prediction unit 315. The relevant content information 120 obtained from the relevance search unit 115 is provided as an input to the novelty determination unit 125. The relevant content information 120 may include content items and/or metadata associated with the relevant content items identified in the content datastore 130 by the relevance search unit 115. In some implementations, just the metadata associated with the relevant content items is provided to the novelty determination unit 125 and the content items may be accessed and presented in the search results once the novelty determination has been made by the novelty determination unit 125.

In some implementations, the data formatting and normalization unit 305 may preprocess and/or normalize the data included in the relevant content information 120 to ensure that the data is in a format that can be processed by the model or models used to by the novelty prediction unit 315 to predict which content of the relevant content is also novel. A technical benefit of this approach is that the novelty determination unit 125 can be configured to utilize different types of models that require different types of inputs.

In some implementations, the novelty prediction unit 315 may train an instance of a deep learning model in response to receiving the relevant content information 120 to serve as the novelty prediction model used to determine the novelty of the relevant content items. In some implementations, the novelty prediction model is trained to compare segments of textual documents to determine whether the novelty of a first segment would be destroyed by a second segment of textual content. In some implementation, the model is configured to compare two paragraphs of textual content, while other implementations may implement a different segment size. For example, some implementations may compare the textual content on a page-by-page basis. Each of the textual documents are compared with the other textual document included in the relevant content items identified by the relevance search unit 115 and a novelty score is computed for each of the textual documents. The novelty score is determined based on how many paragraphs or other segments are determined to be novel. The textual documents are then ranked according to their respective novelty scores and output in the relevant content information 120. The textual documents having a higher novelty score are ranked higher in the relevant content information 120. The relevant content information 120 may be presented on a display of the user device of the user who initiated the search for relevant and novel content.

The novelty prediction unit 315 is configured to train instances of novelty prediction models for non-textual content items in some implementations. Other types of content items, such as but not limited to images, video, and audio content may be segmented and these segments converted to embeddings by a deep learning model which are aggregated per piece of content item. The content items may then be assigned novelty scores based on the how dissimilar the content items are from one another. Determining the most novel content items is different than finding the lowest ranked relevant results by the relevance search unit 115, because the relevance models used by the relevance search unit 115 may be trained to encode similarity differently. Therefore, a document which is determined to be very relevant may have a low novelty score.

Figure 5:
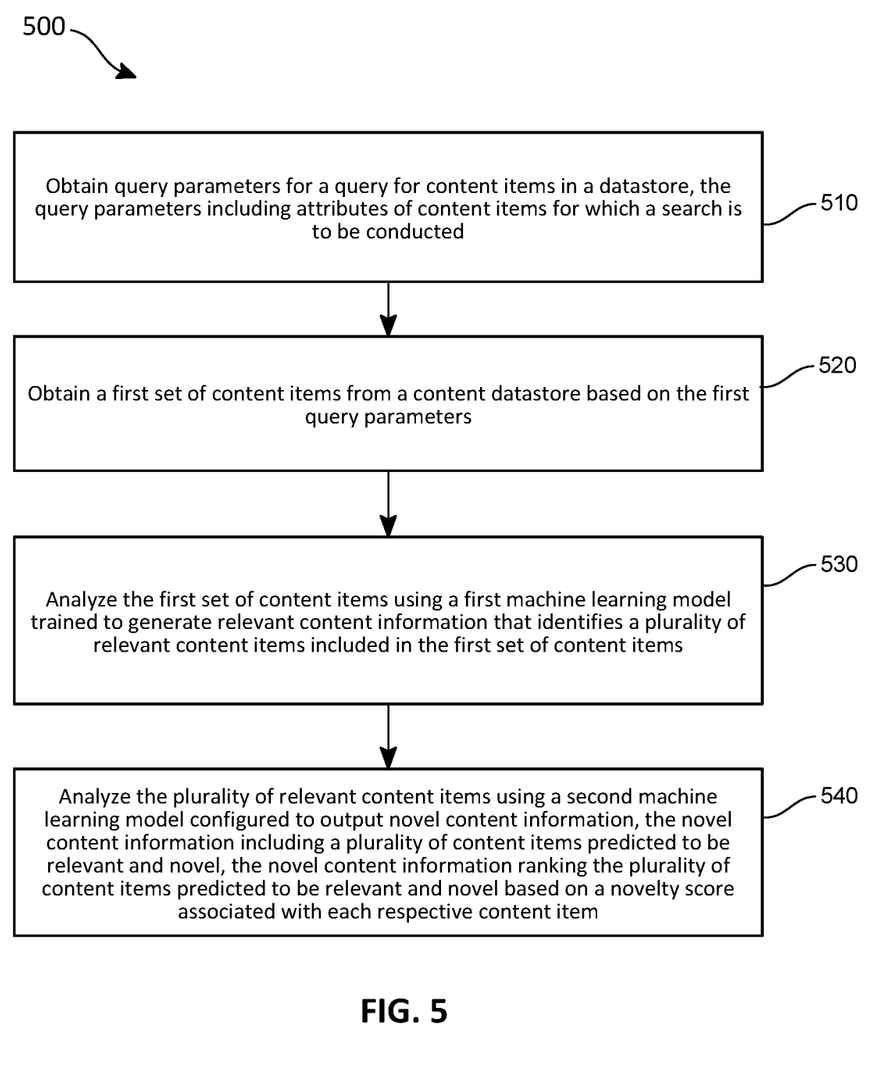
FIG. 5 is a flow diagram of a process for conducting a contextualized search for relevant and novel content according to the techniques provided herein.

FIG. 5 is an example flow chart of an example process 500 for conducting a contextualized search for relevant and novel content that may be implemented by the search pipeline 100.

The process 500 includes an operation 510 of obtaining query parameters for a query for content items in a datastore 130. The query parameters including attributes of content items for which a search is to be conducted. The query parameters may be obtained by the query module 105 discussed in the preceding examples.

The process 500 includes an operation 520 of obtaining a first set of content items from a content datastore 130 based on the query parameters. The graph builder unit 210 may obtain the content items from the content datastore 130 as discussed in the preceding examples.

The process 500 includes an operation 530 of analyzing the first set of content items using a first machine learning model trained to generate relevant content information that identifies a plurality of relevant content items included in the first set of content items. The operation 530 may be implemented by the graph analyzer unit 220.

The process 500 includes an operation 540 of analyzing the plurality of relevant content items using a second machine learning model configured to output novel content information. The novel content information includes a plurality of content items predicted to be relevant and novel. The novel content information ranks the plurality of content items predicted to be relevant and novel based on a novelty score associated with each respective content item. The operation 540 may be implemented by the novelty determination unit 125.

The detailed examples of systems, devices, and techniques described in connection with FIGS. 1-5 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
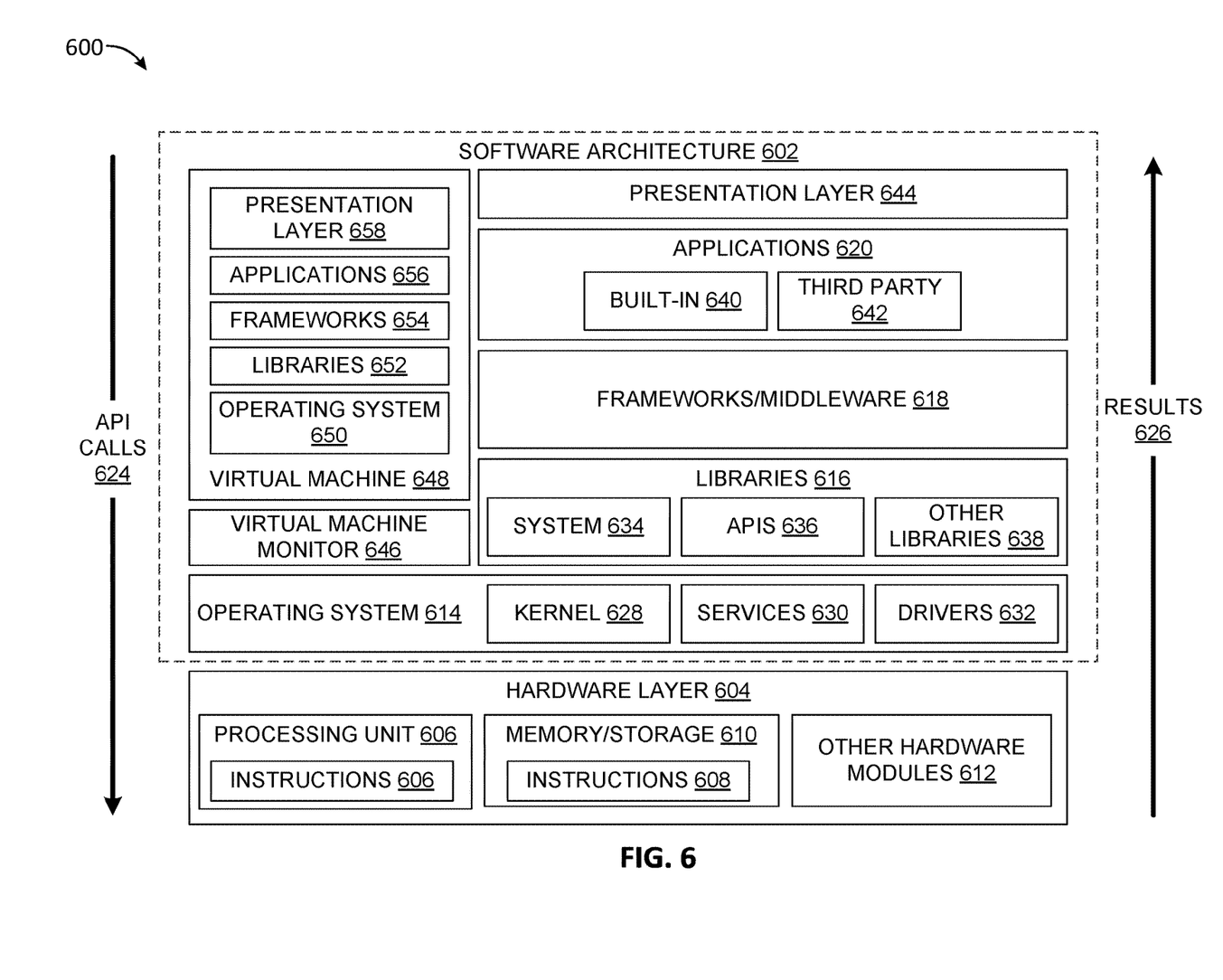
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
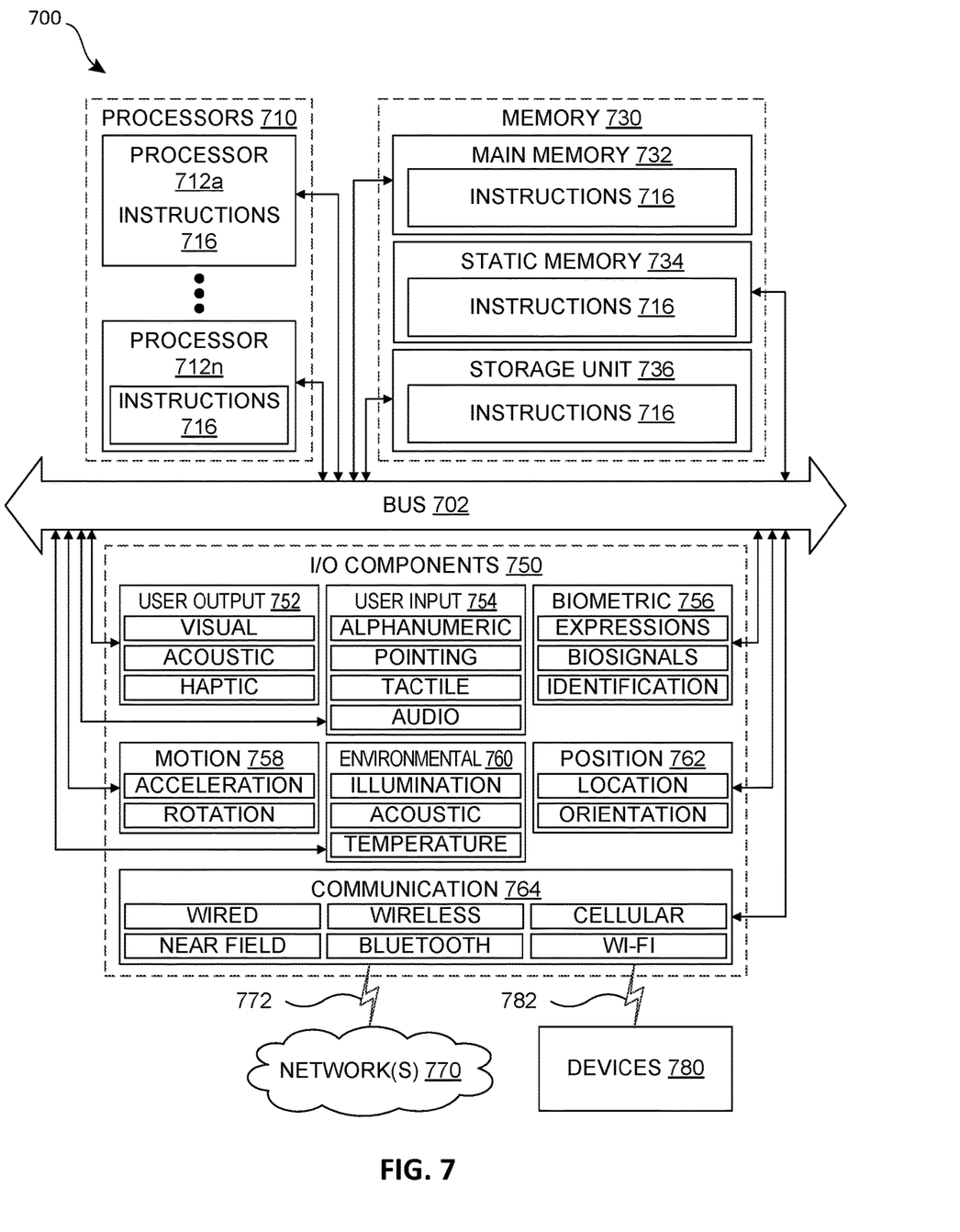
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable storage medium storing executable instructions that, when executed, cause the processor to perform operations comprising:
      obtaining query parameters for a query for content items in a datastore, the query parameters including attributes of content items for which a search is to be conducted;
      obtaining a first set of content items from a content datastore based on the query parameters;
      analyzing the first set of content items using a first machine learning model trained to generate relevant content information that identifies a plurality of relevant content items included in the first set of content items, the first machine learning model is a graph builder model configured to output a weighted graph in which nodes of the weighted graph represent content items or attributes of content items and edges of the weighted graph represent relationships between the nodes, wherein identifying the plurality of relevant content items further comprises:
         generating a subgraph comprising a plurality of nodes and edges from the weighted graph by filtering the weighted graph;
         traversing the subgraph to estimate for a respective node a likelihood of observing the respective node given a specified set of nodes of the subgraph;
         ranking the plurality of nodes based on the likelihood associated with each of nodes; and
         selecting a subset of the nodes of the subgraph based on a rank associated with each of the nodes; and
      analyzing the plurality of relevant content items using a second machine learning model configured to output novel content information, the novel content information including a plurality of content items predicted to be relevant and novel, the novel content information ranking the plurality of content items predicted to be relevant and novel based on a novelty score associated with each respective content item.

2. The data processing system of claim 1, wherein obtaining the query parameters for the query for content items in the datastore further comprises:
   receiving one or more content items associated with the query; and
   analyzing the one or more content items with one or more machine learning models configured to extract query parameters from the one or more content items.

3. The data processing system of claim 1, wherein the machine-readable storage medium includes instructions configured to cause the processor to perform operations of:
   training an instance of a deep learning model as the second machine learning model in response to receiving the subset of the nodes of the subgraph, the instance of the deep learning model being configured to compare content items to determine a novelty score for each of the content items.

4. The data processing system of claim 3, wherein the instance of the deep learning model is configured to perform operations of:
   segmenting each of the content items associated with the subset of the nodes of the subgraph; and
   comparing segments of each respective content items with the segments of other content items to determine a novelty score for each of the content items.

5. The data processing system of claim 4, wherein the machine-readable storage medium includes instructions configured to cause the processor to perform operations of:
   ranking the content items based on the novelty score associated with each of the content items.

6. A method implemented in a data processing system for conducting a contextualized search for relevant and novel content, the method comprising:
   obtaining query parameters for a query for content items in a datastore, the query parameters including attributes of content items for which a search is to be conducted;
   obtaining a first set of content items from a content datastore based on the query parameters;
   analyzing the first set of content items using a first machine learning model trained to generate relevant content information that identifies a plurality of relevant content items included in the first set of content items, the first machine learning model is a graph builder model configured to output a weighted graph in which nodes of the weighted graph represent content items or attributes of content items and edges of the weighted graph represent relationships between the nodes, and identifying the plurality of relevant content items further comprises:
      generating a subgraph comprising a plurality of nodes and edges from the weighted graph by filtering the weighted graph;
      traversing the subgraph to estimate for a respective node a likelihood of observing the respective node given a specified set of nodes of the subgraph;
      ranking the plurality of nodes based the likelihood associated with each of nodes; and
      selecting a subset of the nodes of the subgraph based on a rank associated with each of the nodes; and
   analyzing the plurality of relevant content items using a second machine learning model configured to output novel content information, the novel content information including a plurality of content items predicted to be relevant and novel, the novel content information ranking the plurality of content items predicted to be relevant and novel based on a novelty score associated with each respective content item.

7. The method of claim 6, wherein obtaining the query parameters for the query for content items in the datastore further comprises:
   receiving one or more content items associated with the query; and
   analyzing the one or more content items with one or more machine learning models configured to extract query parameters from the one or more content items.

8. The method of claim 6, further comprising:
   training an instance of a deep learning model as the second machine learning model in response to receiving the subset of the nodes of the subgraph, the instance of the deep learning model being configured to compare content items to determine a novelty score for each of the content items.

9. The method of claim 8, wherein the instance of the deep learning model is configured to perform operations of:
   segmenting each of the content items associated with the subset of the nodes of the subgraph; and
   comparing segments of each respective content items with the segments of other content items to determine a novelty score for each of the content items.

10. The method of claim 9, further comprising:
    ranking the content items based on the novelty score associated with each of the content items.

11. A machine-readable medium on which are stored instructions that, when executed, cause a processor of a programmable device to perform operations of:
    obtaining query parameters for a query for content items in a datastore, the query parameters including attributes of content items for which a search is to be conducted;
    obtaining a first set of content items from a content datastore based on the query parameters;
    analyzing the first set of content items using a first machine learning model trained to generate relevant content information that identifies a plurality of relevant content items included in the first set of content items, the first machine learning model is a graph builder model configured to output a weighted graph in which nodes of the weighted graph represent content items or attributes of content items and edges of the weighted graph represent relationships between the nodes, and identifying the plurality of relevant content items further comprises:
       generating a subgraph comprising a plurality of nodes and edges from the weighted graph by filtering the weighted graph;
       traversing the subgraph to estimate for a respective node a likelihood of observing the respective node given a specified set of nodes of the subgraph;
       ranking the plurality of nodes based the likelihood associated with each of nodes; and
       selecting a subset of the nodes of the subgraph based on a rank associated with each of the nodes; and
    analyzing the plurality of relevant content items using a second machine learning model configured to output novel content information, the novel content information including a plurality of content items predicted to be relevant and novel, the novel content information ranking the plurality of content items predicted to be relevant and novel based on a novelty score associated with each respective content item.

12. The machine-readable medium of claim 11, wherein obtaining the query parameters for the query for content items in the datastore further comprises:
    receiving one or more content items associated with the query; and
    analyzing the one or more content items with one or more machine learning models configured to extract query parameters from the one or more content items.

13. The machine-readable medium of claim 6, further comprising instructions configured to cause the processor to perform operations of:
    training an instance of a deep learning model as the second machine learning model in response to receiving the subset of the nodes of the subgraph, the instance of the deep learning model being configured to compare content items to determine a novelty score for each of the content items.

14. The machine-readable medium of claim 13, wherein the instance of the deep learning model is configured to perform operations of:
- segmenting each of the content items associated with the subset of the nodes of the subgraph; and
- comparing segments of each respective content items with the segments of other content items to determine a novelty score for each of the content items.

\* \* \* \* \*